United States Patent
Yeung et al.

(10) Patent No.: US 11,842,436 B2
(45) Date of Patent: Dec. 12, 2023

(54) SNAPSHOT ARBITRATION TECHNIQUES FOR MEMORY REQUESTS

(71) Applicant: Apple Inc., Cupertino, CA (US)

(72) Inventors: Winnie W. Yeung, San Jose, CA (US); Leela Kishore Kothamasu, Fremont, CA (US); Zelin Zhang, San Jose, CA (US); Guanlan Xu, Santa Clara, CA (US); Eddie M. Robinson, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/816,632

(22) Filed: Aug. 1, 2022

(65) Prior Publication Data
US 2022/0375161 A1      Nov. 24, 2022

Related U.S. Application Data

(63) Continuation of application No. 17/324,857, filed on May 19, 2021, now Pat. No. 11,443,479.

(51) Int. Cl.
| | |
|---|---|
| *G06F 13/362* | (2006.01) |
| *G06T 15/83* | (2011.01) |
| *G06T 15/04* | (2011.01) |
| *G06T 15/00* | (2011.01) |
| *G06F 13/16* | (2006.01) |

(52) U.S. Cl.
CPC .......... *G06T 15/83* (2013.01); *G06F 13/1668* (2013.01); *G06F 13/3625* (2013.01); *G06T 15/005* (2013.01); *G06T 15/04* (2013.01)

(58) Field of Classification Search
None
See application file for complete search history.

(56) References Cited

U.S. PATENT DOCUMENTS

| | | | |
|---|---|---|---|
| 9,069,919 B1* | 6/2015 | James | G06F 30/367 |
| 10,523,576 B1 | 12/2019 | Matthews et al. | |
| 10,990,543 B1* | 4/2021 | Bouzguarrou | G06F 13/161 |
| 2014/0344536 A1 | 11/2014 | Benisty et al. | |
| 2015/0220460 A1* | 8/2015 | Litch | G06F 13/1621 |
| | | | 710/114 |
| 2018/0018097 A1* | 1/2018 | Kazakov | G06F 13/1626 |
| 2019/0303297 A1 | 10/2019 | Fleming, Jr. et al. | |
| 2021/0014177 A1* | 1/2021 | Kasichainula | H04L 47/6295 |

* cited by examiner

*Primary Examiner* — Michael Sun
(74) *Attorney, Agent, or Firm* — Kowert, Hood, Munyon, Rankin & Goetzel, P.C.; Michael B. Davis; Dean M. Munyon

(57) ABSTRACT

Techniques are disclosed relating to arbitration for computer memory resources. In some embodiments, an apparatus includes queue circuitry that implements multiple queues configured to queue requests to access a memory bus. Control circuitry may, in response to detecting a first threshold condition associated with the queue circuitry, generate a first snapshot that indicates numbers of requests in respective queues of the multiple queues at a first time. The control circuitry may generate a second snapshot that indicates numbers of requests in respective queues of the multiple queues at a second time that is subsequent to the first time. The control circuitry may arbitrate between requests from the multiple queues to select requests to access the memory bus, where the arbitration is based on snapshots to which requests from the multiple queues belong. Disclosed techniques may approximate age-based scheduling while reducing area and power consumption.

20 Claims, 13 Drawing Sheets

Generate, in response to detecting a first threshold condition associated with queue circuitry that includes multiple queues, a first snapshot that indicates numbers of requests in respective queues of the multiple queues at a first time
1010

Generate a second snapshot that indicates numbers of requests in respective queues of the multiple queues at a second time that is subsequent to the first time
1020

Arbitrate between requests from the multiple queues to select requests to access the memory bus, wherein the arbitrating is based on snapshots to which requests from the multiple queues belong
1030

SNAPSHOT ARBITRATION TECHNIQUES FOR MEMORY REQUESTS

CROSS-REFERENCE TO RELATED APPLICATIONS

The present application is a continuation of U.S. application Ser. No. 17/324,857, entitled "Snapshot Arbitration Techniques for Memory Requests," filed May 19, 2021, the disclosure which is incorporated by reference herein in its entirety.

BACKGROUND

Technical Field

This disclosure relates to arbitration for computer memory resources.

Description of the Related Art

Computer memory is typically available to multiple requesting agents via one or more channels. Control circuitry may arbitrate among requests to grant access to a particular memory. Some types of arbitration such as round-robin selection may be inexpensive in terms of area and power consumption but may provide poor performance for clients with larger numbers of requests. Other types of arbitration such as age-based schemes may provide more fairness among requesters by selecting requests in the order they were submitted, but may be relatively expensive in terms of area and power consumption.

DETAILED DESCRIPTION

Figure 1A:
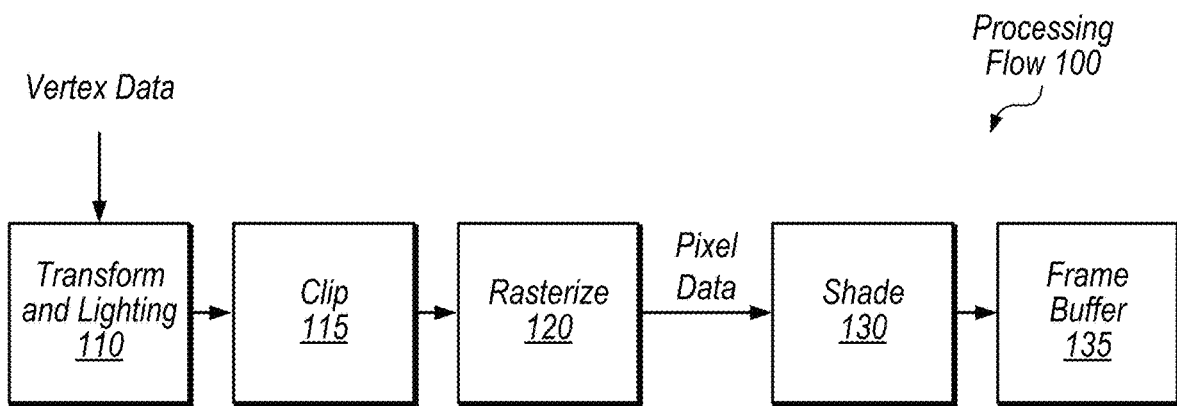
FIG. 1A is a diagram illustrating an overview of example graphics processing operations, according to some embodiments.
Figure 1B:
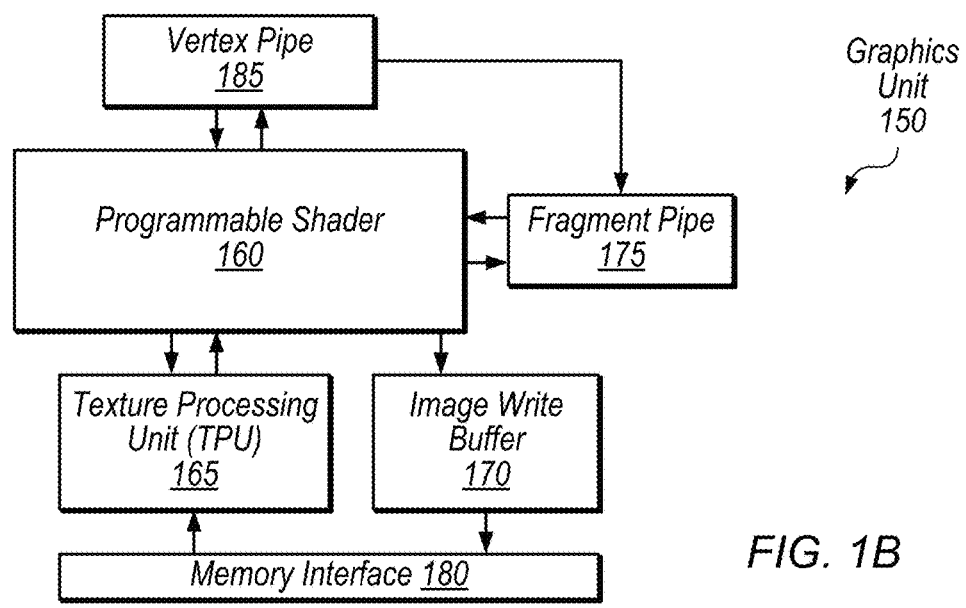
FIG. 1B is a block diagram illustrating an example graphics unit, according to some embodiments.
Figure 2:
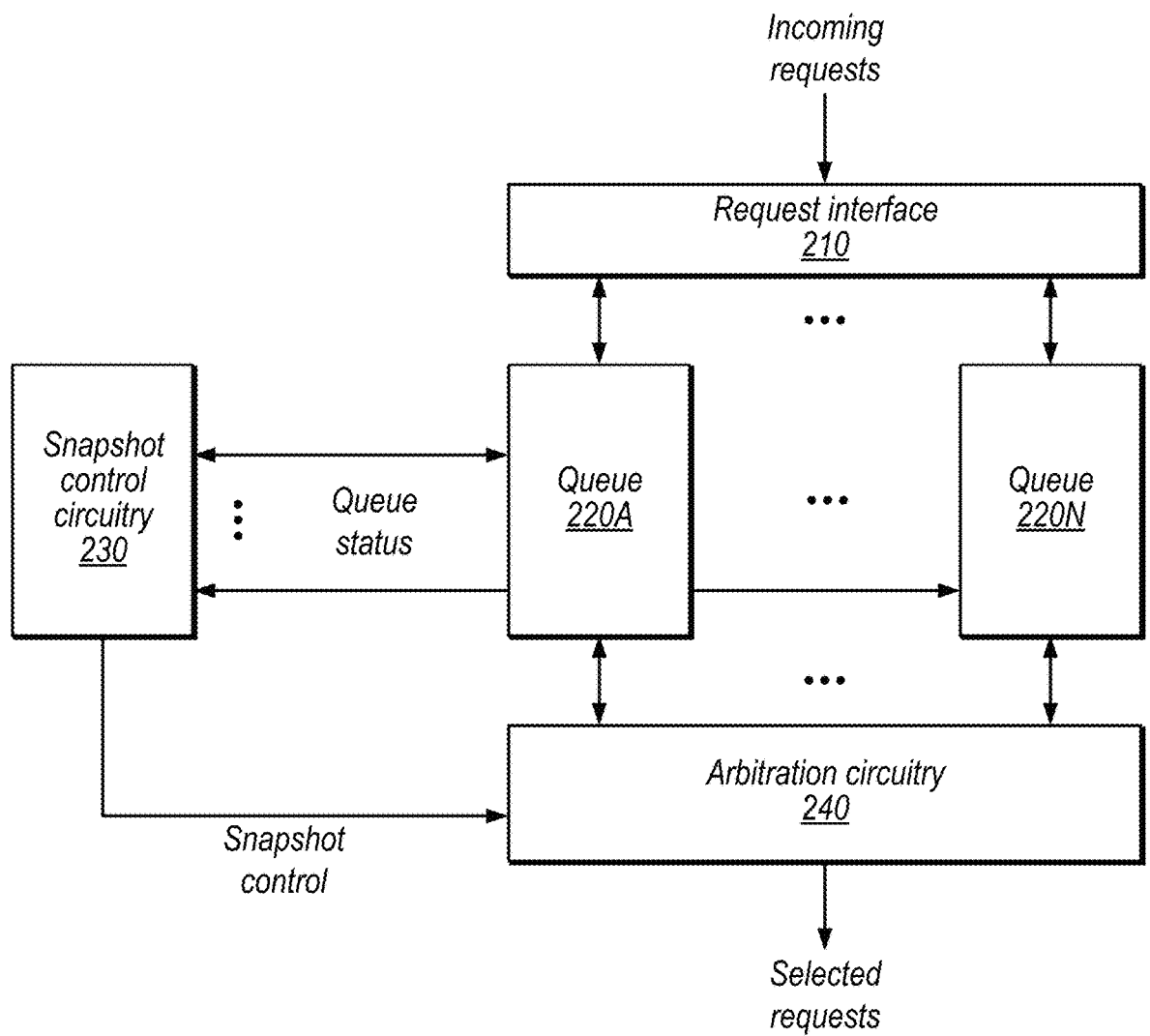
FIG. 2 is a block diagram illustrating example snapshot control and arbitration circuitry, according to some embodiments.
Figure 3:
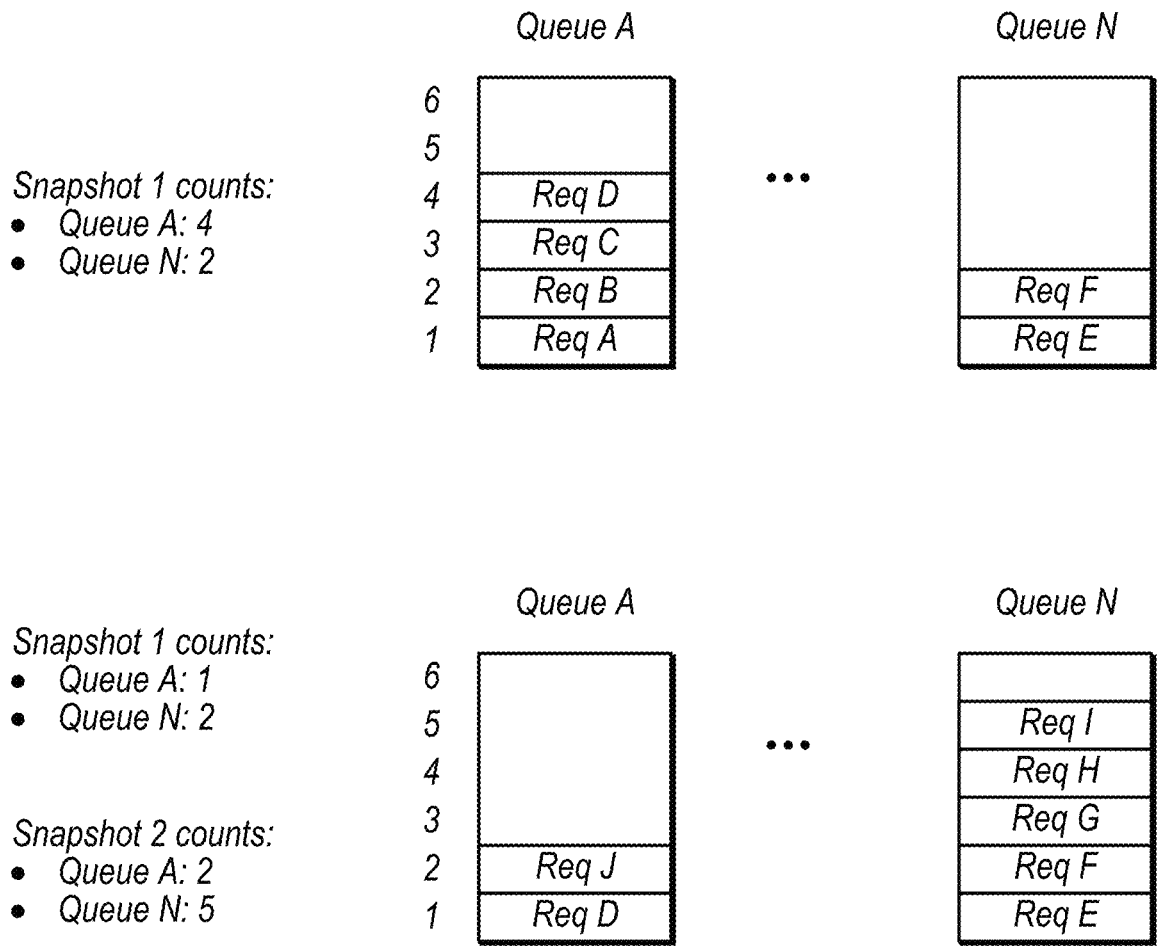
FIG. 3 is a diagram illustrating example counter-based snapshot states at different points in time, according to some embodiments.
Figure 4:
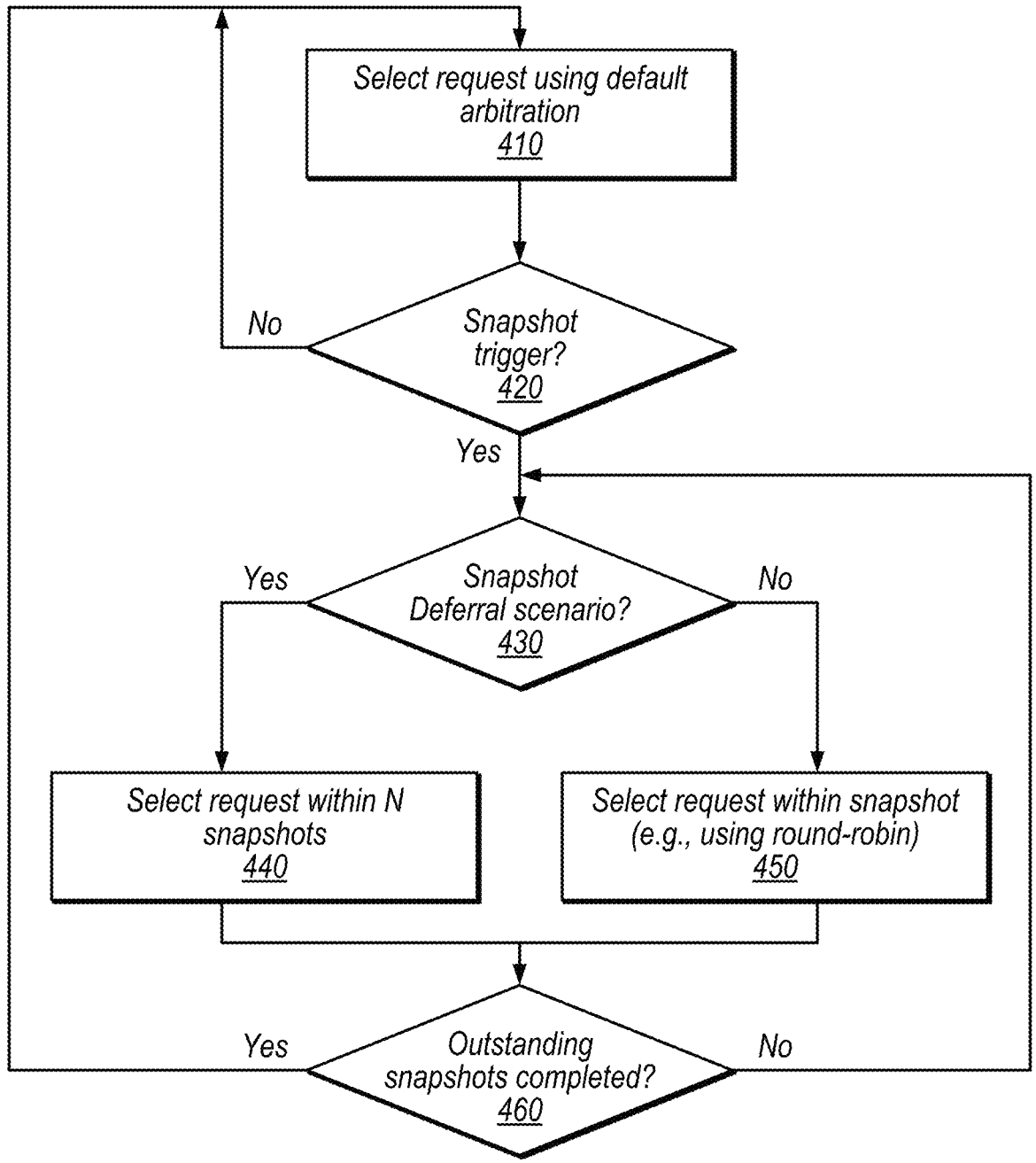
FIG. 4 is a flow diagram illustrating an example snapshot-based arbitration technique, according to some embodiments.
Figure 7:
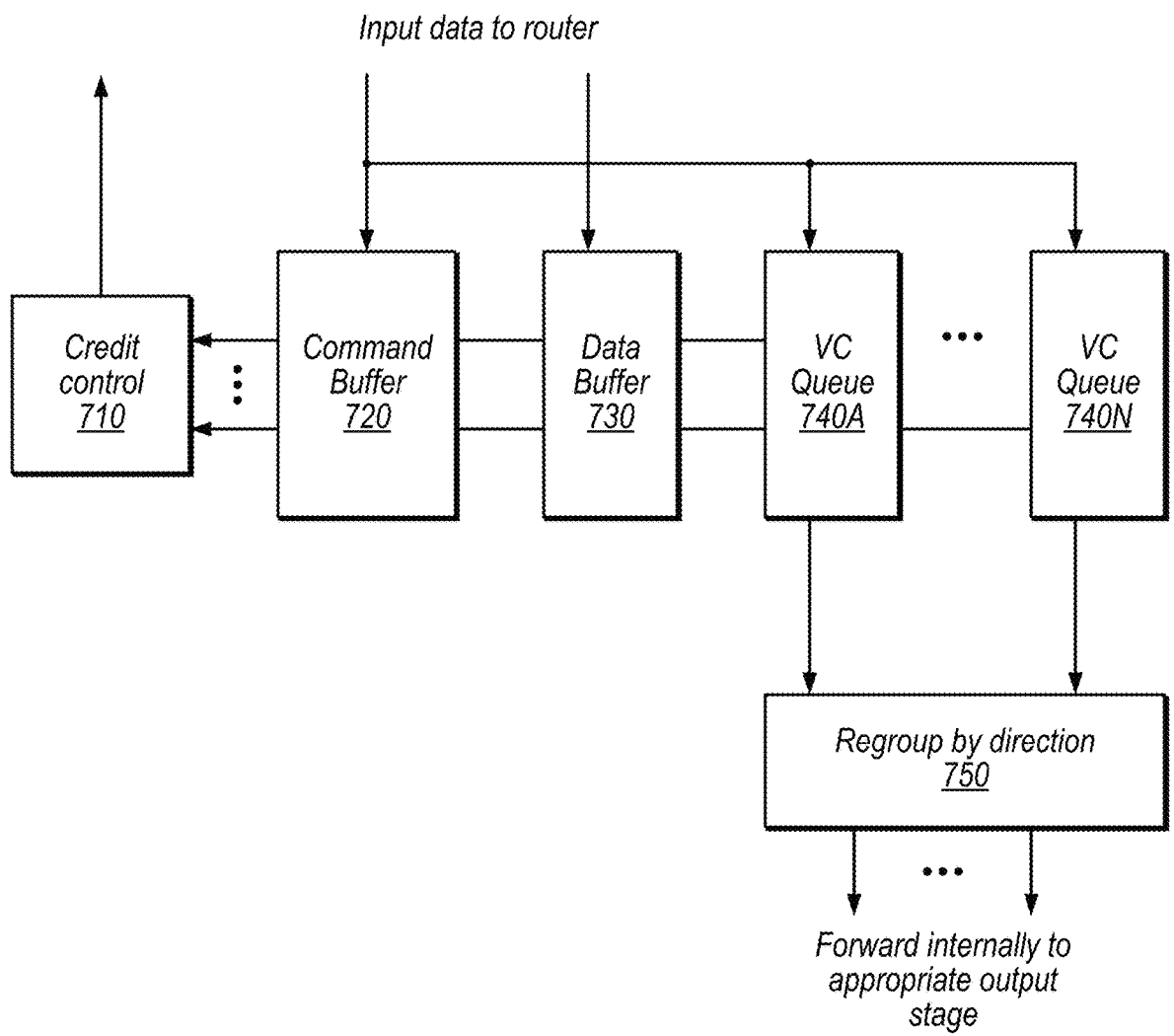
FIG. 7 is a block diagram illustrating example router input circuitry, according to some embodiments.
Figure 8:
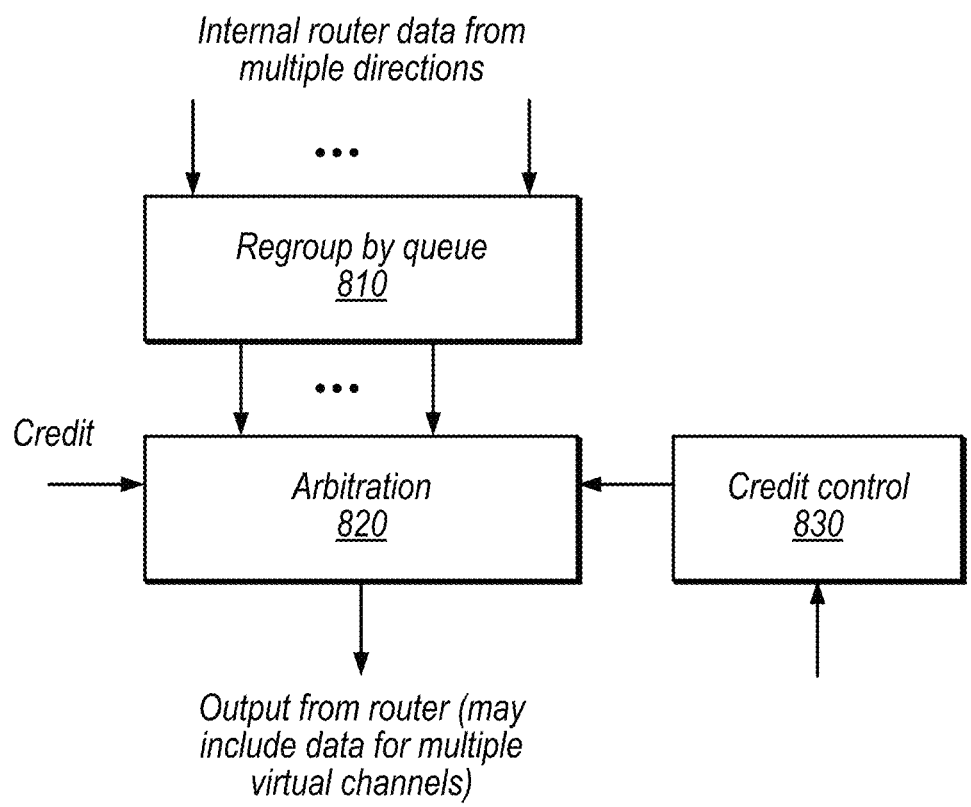
FIG. 8 is a block diagram illustrating example router output circuitry, according to some embodiments.
Figure 9:
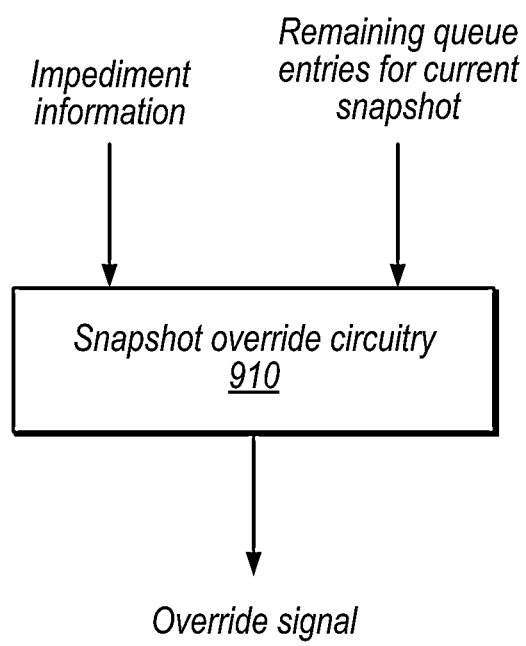
FIG. 9 is a block diagram illustrating example snapshot override circuitry, according to some embodiments.

In disclosed embodiments snapshot-based arbitration may provide similar desirable arbitration performance to time-stamp arbitration in certain scenarios, but with reduced circuitry complexity and power consumption. FIGS. 1A-1B provide an overview of graphics processing, which may utilize disclosed arbitration techniques (although these techniques may also be implemented in other scenarios such as CPUs or memory management units). FIGS. 2-4 provide examples of snapshot-based arbitration techniques. FIGS. 5-8 provide example routing circuitry for a split cache architecture that may utilize disclosed arbitration techniques. FIG. 9 shows circuitry configured to override an oldest snapshot in certain scenarios. FIGS. 10-13 provide example methods, devices, systems, and computer-readable media.

Graphics Processing Overview

Referring to FIG. 1A, a flow diagram illustrating an example processing flow 100 for processing graphics data is shown. In some embodiments, transform and lighting procedure 110 may involve processing lighting information for vertices received from an application based on defined light source locations, reflectance, etc., assembling the vertices into polygons (e.g., triangles), and transforming the polygons to the correct size and orientation based on position in a three-dimensional space. Clip procedure 115 may involve discarding polygons or vertices that fall outside of a viewable area. Rasterize procedure 120 may involve defining fragments within each polygon and assigning initial color values for each fragment, e.g., based on texture coordinates of the vertices of the polygon. Fragments may specify attributes for pixels which they overlap, but the actual pixel attributes may be determined based on combining multiple fragments (e.g., in a frame buffer), ignoring one or more fragments (e.g., if they are covered by other objects), or both. Shade procedure 130 may involve altering pixel components based on lighting, shadows, bump mapping, translucency, etc. Shaded pixels may be assembled in a frame buffer 135. Modern GPUs typically include programmable shaders that allow customization of shading and other processing procedures by application developers. Thus, in various embodiments, the example elements of FIG. 1A may be performed in various orders, performed in parallel, or omitted. Additional processing procedures may also be implemented.

Referring now to FIG. 1B, a simplified block diagram illustrating a graphics unit 150 is shown, according to some embodiments. In the illustrated embodiment, graphics unit 150 includes programmable shader 160, vertex pipe 185, fragment pipe 175, texture processing unit (TPU) 165, image write unit 170, and memory interface 180. In some embodiments, graphics unit 150 is configured to process both vertex and fragment data using programmable shader 160, which may be configured to process graphics data in parallel using multiple execution pipelines or instances.

Vertex pipe 185, in the illustrated embodiment, may include various fixed-function hardware configured to process vertex data. Vertex pipe 185 may be configured to communicate with programmable shader 160 in order to coordinate vertex processing. In the illustrated embodiment, vertex pipe 185 is configured to send processed data to fragment pipe 175 or programmable shader 160 for further processing.

Fragment pipe 175, in the illustrated embodiment, may include various fixed-function hardware configured to process pixel data. Fragment pipe 175 may be configured to communicate with programmable shader 160 in order to coordinate fragment processing. Fragment pipe 175 may be configured to perform rasterization on polygons from vertex pipe 185 or programmable shader 160 to generate fragment data. Vertex pipe 185 and fragment pipe 175 may be coupled to memory interface 180 (coupling not shown) in order to access graphics data.

Programmable shader 160, in the illustrated embodiment, is configured to receive vertex data from vertex pipe 185 and fragment data from fragment pipe 175 and TPU 165. Programmable shader 160 may be configured to perform vertex processing tasks on vertex data which may include various transformations and adjustments of vertex data. Programmable shader 160, in the illustrated embodiment, is also configured to perform fragment processing tasks on pixel data such as texturing and shading, for example. Programmable shader 160 may include multiple sets of multiple execution pipelines for processing data in parallel.

In some embodiments, programmable shader includes pipelines configured to execute one or more different SIMD groups in parallel. Each pipeline may include various stages configured to perform operations in a given clock cycle, such as fetch, decode, issue, execute, etc. The concept of a processor "pipeline" is well understood, and refers to the concept of splitting the "work" a processor performs on instructions into multiple stages. In some embodiments, instruction decode, dispatch, execution (i.e., performance), and retirement may be examples of different pipeline stages. Many different pipeline architectures are possible with varying orderings of elements/portions. Various pipeline stages perform such steps on an instruction during one or more processor clock cycles, then pass the instruction or operations associated with the instruction on to other stages for further processing.

The term "SIMD group" is intended to be interpreted according to its well-understood meaning, which includes a set of threads for which processing hardware processes the same instruction in parallel using different input data for the different threads. Various types of computer processors may include sets of pipelines configured to execute SIMD instructions. For example, graphics processors often include programmable shader cores that are configured to execute instructions for a set of related threads in a SIMD fashion. Other examples of names that may be used for a SIMD group include: a wavefront, a clique, or a warp. A SIMD group may be a part of a larger thread group, which may be broken up into a number of SIMD groups based on the parallel processing capabilities of a computer. In some embodiments, each thread is assigned to a hardware pipeline that fetches operands for that thread and performs the specified operations in parallel with other pipelines for the set of threads. Note that processors may have a large number of pipelines such that multiple separate SIMD groups may also execute in parallel. In some embodiments, each thread has private operand storage, e.g., in a register file. Thus, a read of a particular register from the register file may provide the version of the register for each thread in a SIMD group.

In some embodiments, multiple programmable shader units 160 are included in a GPU. In these embodiments, global control circuitry may assign work to the different sub-portions of the GPU which may in turn assign work to shader cores to be processed by shader pipelines.

TPU 165, in the illustrated embodiment, is configured to schedule fragment processing tasks from programmable shader 160. In some embodiments, TPU 165 is configured to pre-fetch texture data and assign initial colors to fragments for further processing by programmable shader 160 (e.g., via memory interface 180). TPU 165 may be configured to provide fragment components in normalized integer formats or floating-point formats, for example. In some embodiments, TPU 165 is configured to provide fragments in groups of four (a "fragment quad") in a 2×2 format to be processed by a group of four execution pipelines in programmable shader 160.

Image write unit (IWU) 170, in some embodiments, is configured to store processed tiles of an image and may perform operations to a rendered image before it is transferred for display or to memory for storage. In some embodiments, graphics unit 150 is configured to perform tile-based deferred rendering (TBDR). In tile-based rendering, different portions of the screen space (e.g., squares or rectangles of pixels) may be processed separately. Memory interface 180 may facilitate communications with one or more of various memory hierarchies in various embodiments.

Overview of Snapshot-Based Arbitration

FIG. 2 is a block diagram illustrating example circuitry that supports snapshot arbitration, according to some embodiments. In the illustrated embodiment, circuitry includes request interface 210, queues 220A-220N, snapshot control circuitry 230, and arbitration circuitry 240.

Request interface 210, in the illustrated embodiment, is configured to receive requests from multiple different channels and assign requests to corresponding queues 220. The channels may be different physical channels or may be virtual channels that share underlying physical buses. In some embodiments, request interface 210 receives router data from multiple directions and regroups requests by channel, as discussed in detail below with reference to FIG. 8. In some embodiments request interface 210 may be omitted and requests may be submitted directly to a queue 220.

Queues 220, in the illustrated embodiment, are first-in first-out (FIFO) queues configured to store requests for arbitration and outputs requests in the order in which they were received. In the illustrated embodiment, the head of each queue is eligible for arbitration, assuming any other requirements for availability are met (e.g., assuming the queue has sufficient credits to submit requests for arbitration in credit-based implementations).

Snapshot control circuitry 230, in the illustrated embodiment, is configured to generate snapshots at different times, e.g., in response to an event such a threshold queue status being satisfied. For example, snapshot control circuitry may monitor for events such as a queue meeting a threshold number of valid entries, a threshold number of queues meeting a threshold number of valid entries, the total number of entries in queues 220 meeting a threshold number of valid entries, etc.

In some embodiments, snapshot control circuitry 230 supports generating and tracking multiple snapshots at the same time. In some embodiments, supporting a greater number of snapshots may provide a closer approximation to timestamp-based arbitration but may increase area requirements, e.g., for counters to store data for different snapshots.

Therefore, different embodiments may support different numbers of snapshots or a given embodiment may support multiple operating modes with different maximum numbers of snapshots per mode.

Arbitration circuitry 240, in the illustrated embodiment, is configured to select from among available entries in queues 220 to provide selected requests (e.g., to allow those requests to access a memory such as a cache or to access a memory bus). In some embodiments arbitration circuitry is configured to arbitrate according to one or more default modes of operation prior to beginning snapshot-based arbitration. Note that arbitration circuitry 240 may implement one level of arbitration in a multi-level arbitration scheme. Therefore, requests may proceed through arbitration prior to and after the disclosed arbitration at arbitration circuitry 240. Other levels of arbitration may use similar or different arbitration techniques.

In some embodiments arbitration circuitry is configured to perform weighted round-robin arbitration among queues prior to initiating snapshot arbitration. In weighted round-robin mode, some queues have a greater weight than other queues. The weights may be based on expected traffic from different channels, for example. In some situations, however, one queue may have an unexpected number of requests or the overall traffic may increase, which may trigger a snapshot event. At this time, snapshot control circuitry 230 may generate snapshot data and signal to arbitration circuitry 240 to begin snapshot-based arbitration.

Snapshot-based arbitration may take various forms in different embodiments or operating modes. For example, strict snapshot arbitration may select all requests from the current oldest snapshot before selecting any requests that are not in this snapshot (although the current snapshot may be overridden in certain circumstances). In other embodiments, snapshot information may be used as one input among others in an arbitration procedure, e.g., to provide a greater priority weight to requests from the current oldest snapshot than to other requests.

FIG. 3 is a diagram illustrating example counter-based snapshot data at different times, according to some embodiments. The upper portion of FIG. 3 represents a first point in time and the lower portion of FIG. 3 represents a second, later point in time.

At the first point in time, snapshot 1 has four entries in queue A and two entries in queue N. At the second point in time, another snapshot (snapshot 2) has been taken and snapshot 1 only has one entry in queue A and two entries in queue N. At this point, snapshot 2 has two entries in queue A (including one that is also in snapshot 1) and five entries in queue N (including two that are also in snapshot 1).

In the illustrated embodiment, circuitry for each snapshot may include a counter for each queue that supports counting up to the maximum number of entries in the queue. Note that the disclosed counters are included for purposes of explanation but are not intended to limit the scope of the present disclosure. In other embodiments, any of various encodings may be used to represent snapshots, e.g., with separate counts such that snapshots are non-overlapping (in which case the counts for snapshot 2 in FIG. 3 would be one for queue A and three for queue N), pointer-based tracking of the tail of snapshots, tracking a request identifier or other content of the last request per queue in a snapshot, etc. In various embodiments, snapshot control circuitry 230 may indicate to arbitration circuitry 240 which queues have head entries that are in the current oldest snapshot (or may alternatively identify the snapshot of the head entries of each queue).

FIG. 4 is a flow diagram illustrating an example method for snapshot-based arbitration, according to some embodiments. At 410, in the illustrated embodiment, arbitration circuitry 240 selects a request using a default arbitration technique. At 420, the system determines whether a snapshot has been triggered, if not, flow proceeds to 410 and arbitration circuitry 240 selects another request using the default technique. If a snapshot has been triggered, flow proceeds to 430. Note that additional snapshots may be triggered while in snapshot-based arbitration mode, based on similar threshold(s) to the initial snapshot or based on different threshold(s) that are specific to situations where a snapshot has already been triggered.

At 430, the system determines whether there is a snapshot deferral scenario. In the illustrated embodiment, if there is no a deferral scenario (also referred to herein as an override scenario), arbitration circuitry selects a request within the oldest snapshot, e.g., using round-robin techniques among queues. In some embodiments, snapshot control circuitry 230 provides a signal indicating whether the head of each queue is included in the oldest snapshot and arbitration circuitry 240 may not consider requests that are not in the oldest snapshot. If a snapshot deferral scenario is detected, flow proceeds to 440.

At 440, in the illustrated example, arbitration circuitry 240 selects a request from within the N oldest snapshots (e.g., the oldest two snapshots). The number of snapshots N may be fixed or may be dynamically determined based on current operating conditions. This may allow selection from younger snapshots when the oldest snapshot does not have available requests, e.g., due to all channels with requests for the oldest snapshot waiting for credits from downstream circuitry. (Note that circuitry may implement other deferral techniques and techniques for arbitrating among different snapshots, as discussed in detail below with reference to FIG. 9.)

At 460, in the illustrated embodiment, the system determines whether all outstanding snapshots have been completed. If so, flow proceeds to 410 and default arbitration proceeds. If not, flow proceeds to 430 and snapshot-based arbitration continues. Note that in other embodiments, the snapshot control circuitry 230 may exit snapshot-based arbitration before completing all outstanding snapshots, e.g., when queue entries are below one or more thresholds. In this situation, snapshot control circuitry 230 may clear any remaining snapshot data or may retain the remaining snapshot data in case snapshot-based arbitration is triggered again.

Note that in some embodiments, certain channels may have a fixed priority or be otherwise prioritized. Therefore, arbitration circuitry 240 may select from these queues even when the requests from the queues are not in the oldest snapshot during snapshot-based arbitration, in some scenarios. Said another way, snapshot-based arbitration may be used for only a subset of queues while other queues may use other arbitration schemes. Generally, snapshot information may be used as an arbitration input in combination with various other appropriate arbitration data.

Figure 5:
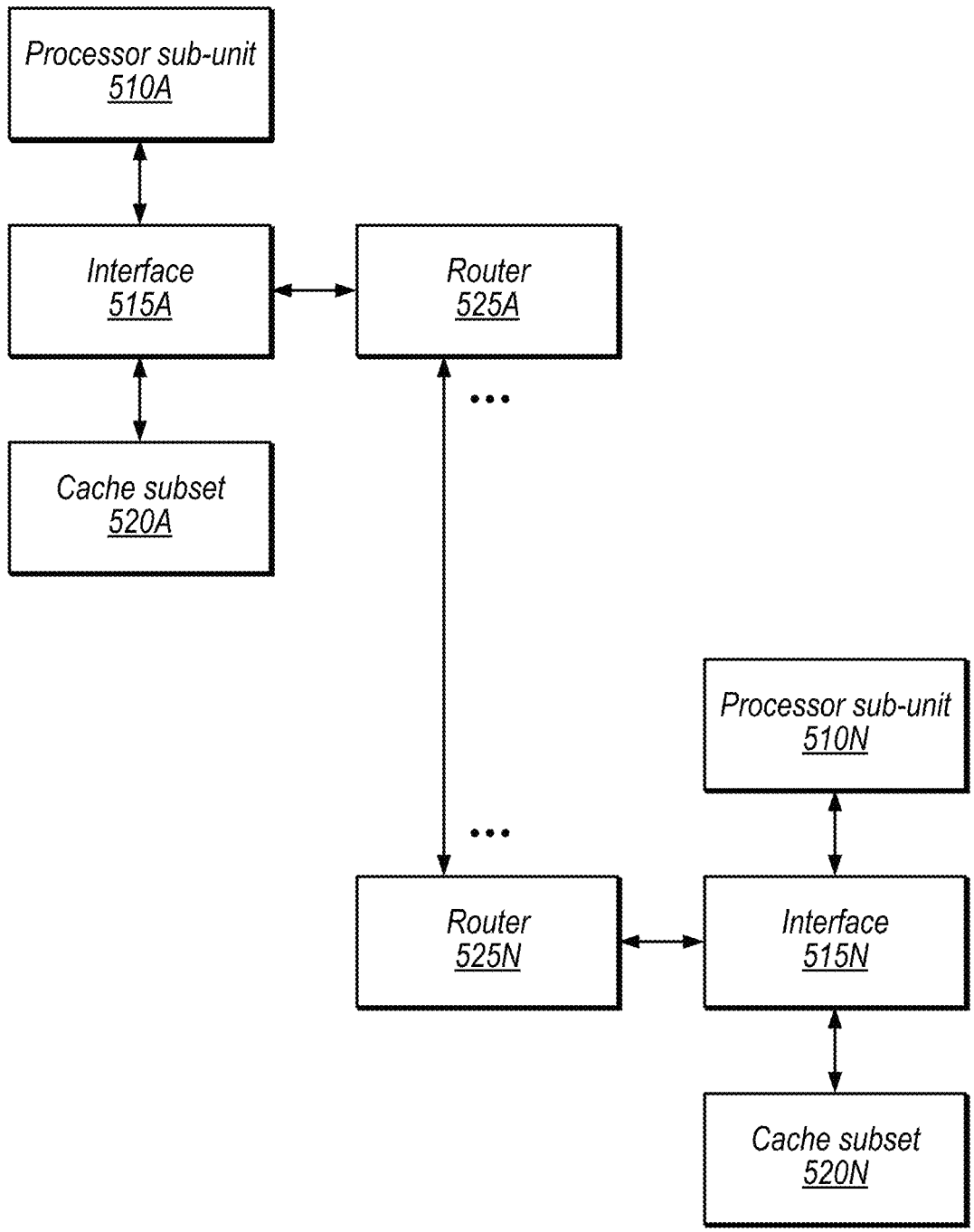
FIG. 5 is a block diagram illustrating example an example split cache architecture, according to some embodiments.

Example split cache architecture with routing circuitry that implements snapshots FIG. 5 is a block diagram illustrating an example split cache architecture, according to some embodiments. In the illustrated embodiment, a device includes multiple processor sub-units 510A-510N (which may be GPU instances connected to form a larger graphics processor, for example), multiple interfaces 515A-515N, multiple cache subsets 520A-520N, and multiple routers 525A-525N.

The processor sub-units 510 may be included on the same die or on different dies and may communicate via one or more communication fabrics (which may include separate networks for workload management control signals and data, for example). The processor sub-units may include various agents that a memory hierarchy that includes cache subsets 520.

Cache subsets 520, in some embodiments, store different subsets of a given cache level (e.g., an L2 cache, L1 cache, etc.). The cache implemented by subsets 520 may be an instruction cache, a data cache, or both. In some embodiments, each cache subset implements a subset of a cache memory space and the subsets do not overlap. In other embodiments, processor sub-units 510 may have corresponding memory sub-sets of a memory space, which may not be a cache space. Having a split cache architecture may be advantageous in distributed GPU architectures, for example.

Interfaces 515, in some embodiments, are configured to receive memory transaction requests from a corresponding processor sub-unit 510 or from a router 525. For transaction requests with addresses in the corresponding cache subset 520, the interface may submit the requests to the cache subset. For requests with addresses in a different cache subset, an interface 515 forwards the transaction requests to a router 525 for routing to the appropriate cache subset 520. In some embodiments, interfaces 515 implement a portion of a credit interface and may track credits for different channels.

Figure 6:
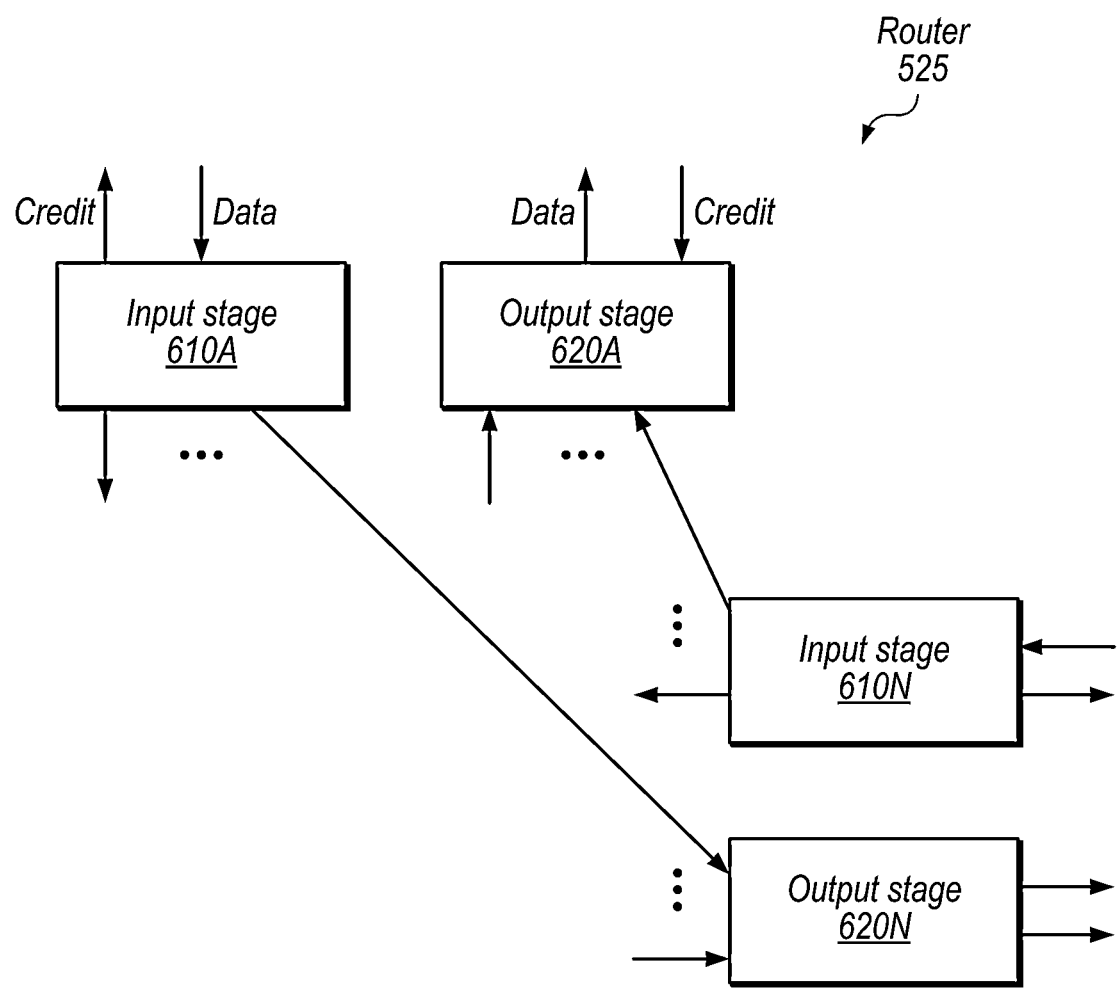
FIG. 6 is a block diagram illustrating router circuitry that may incorporate snapshot-based arbitration, according to some embodiments.

Routers 525, in some embodiments, are configured to route transaction requests in multiple directions. For example, for a system with N cache subsets, routers 525 may be configured to route transactions to N-1 other routers. In some embodiments, each router 525 implements an instance of arbitration circuitry 240. Disclosed arbitration techniques may provide snapshot arbitration to approximate time-based arbitration when queue thresholds are reached. FIGS. 6-8 provide a more detailed illustration of example router 525 embodiments.

FIG. 6 is a block diagram illustrating a router 525 that includes multiple input stages 610 and multiple output stages 620. In the illustrated embodiment, each input stage includes a bus to send request data to each output stage. For example, in an embodiment with four input stages and four output stages, each input stage may provide four output buses and each output stage may receive four input buses.

In some embodiments, each input stage is configured to route request data to the appropriate output stage, e.g., based on a portion of the address associated with the request. In the illustrated embodiment, input stages provide credit data and output stages receive credit data. Note that credit tracking is one example technique to provide quality of service among multiple channels, but is not intended to limit the scope of the present disclosure; other techniques are contemplated.

FIG. 7 is a block diagram illustrating an example input stage for a router, according to some embodiments. In the illustrated embodiment, the input stage includes credit control circuitry 710, command buffer 720, data buffer 730, virtual channel (VC) queues 740A-740N, and regroup by direction circuitry 750. In some embodiments, some incoming transaction requests are split into command portions stored in command buffer 720 and data portions stored in data buffer 730. Requests are tracked in a corresponding in-order VC queue 740, e.g., depending on the type of request. Note that multiple queues 740 may be implemented for a given virtual channel. In some embodiments, separate queues are maintained for writes and reads. The queues may avoid blocking between channels while maintaining packet ordering for a given channel. Credit control circuitry 710 may forward credit information from downstream circuitry to requesting agents.

Regroup by direction circuitry 750, in the illustrated embodiment, is configured to send packets to the appropriate output stage for the proper router direction, e.g., based on a portion of an address of the transaction. For example, different transactions within the same channel may be routed to different directions based on their addresses.

FIG. 8 is a block diagram illustrating an example output stage for a router that includes arbitration circuitry, according to some embodiments. In the illustrated embodiment, the output stage receives internal router data from multiple input stages. The output stage, in this example, includes regroup by channel circuitry 810, arbitration circuitry 820, and credit control circuitry 830.

Regroup by channel circuitry 810, in some embodiments, is configured to regroup router data from multiple directions by queue. Therefore, each channel may present one or more input packets to arbitration circuitry 820 from the VC queue(s) 740 in one or more input stages.

Arbitration circuitry 820 may arbitrate among queues, among channels, or both, e.g., according to the techniques discussed above with reference to arbitration circuitry 240. In some embodiments, only inputs with available credits (e.g., as indicated by credit control 830) are eligible for arbitration. The arbitration circuitry 820 outputs selected requests, e.g., via an interface 515 to a cache subset 520. In some embodiments, arbitration circuitry 820 first arbitrates among virtual channels and then arbitrates among queues for a given virtual channel.

FIG. 9 is a block diagram illustrating example snapshot override circuitry, according to some embodiments. In the illustrated embodiment, circuitry 910 receives impediment information and information indicating remaining queue entries for the current snapshot and outputs an override signal to arbitration circuitry. In some embodiments, circuitry 910 is configured to allow selection of requests from one or more other snapshots that are not included in the oldest snapshot based on the impediment information. For example, the impediment information may indicate that all requests for the oldest snapshot are waiting for credits and therefore unavailable for arbitration.

Speaking generally, multiple types of impediments may be used to override snapshot arbitration, and snapshot arbitration may not require fixed selection of the oldest snapshot before any other snapshots. For example, snapshots may be used to weight requests as an input to an arbitration algorithm, but the arbitration circuitry 240 may select requests based on various other arbitration inputs as well.

Example Method

Figure 10:
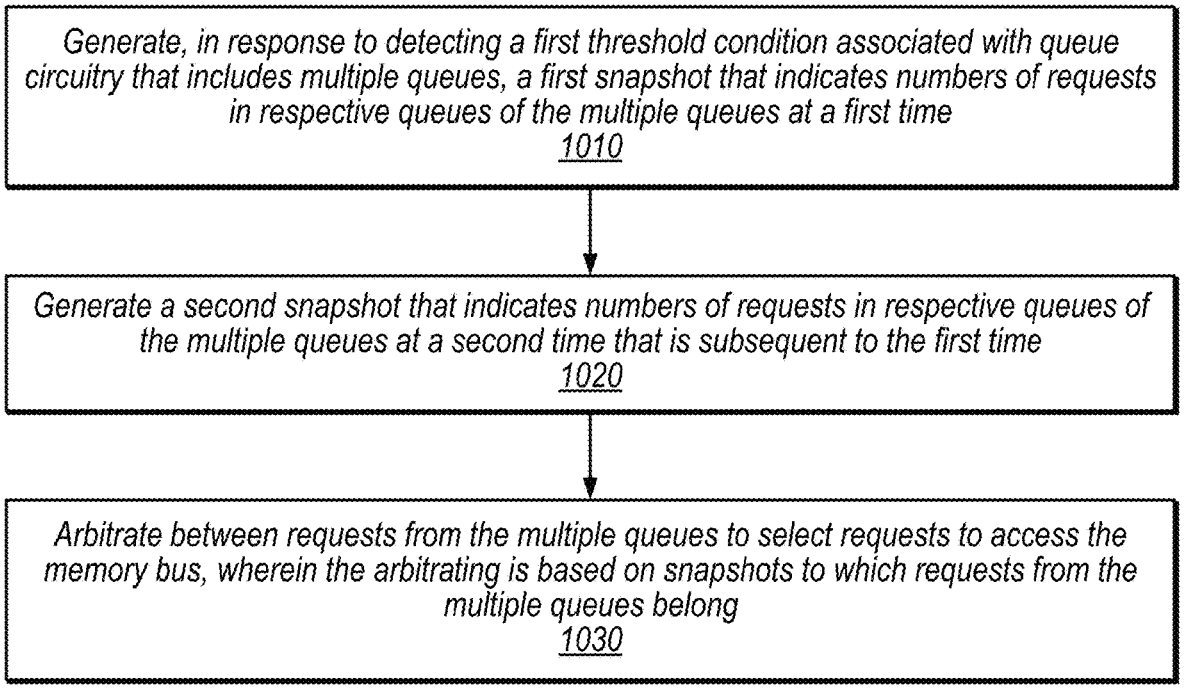
FIG. 10 is a flow diagram illustrating an example method, according to some embodiments.

FIG. 10 is a flow diagram illustrating an example method for snapshot-based arbitration, according to some embodiments. The method shown in FIG. 10 may be used in conjunction with any of the computer circuitry, systems, devices, elements, or components disclosed herein, among others. In various embodiments, some of the method elements shown may be performed concurrently, in a different order than shown, or may be omitted. Additional method elements may also be performed as desired.

At 1010, in the illustrated embodiment, control circuitry generates a first snapshot that indicates numbers of requests in respective queues of multiple queues at a first time. The generating is performed in response to detecting a first threshold condition associated with queue circuitry that includes the multiple queues. One or more of the queues may maintain ordering among requests of one or more virtual channels that are shared by multiple client circuits.

At 1020, in the illustrated embodiment, control circuitry generates a second snapshot that indicates numbers of requests in respective queues of the multiple queues at a second time that is subsequent to the first time. Thus, in some embodiments, the control circuitry supports tracking multiple snapshots at the same time.

At 1030, in the illustrated embodiment, control circuitry arbitrates between requests from the multiple queues to select requests to access the memory bus, wherein the arbitrating is based on snapshots to which requests from the multiple queues belong.

In some embodiments, the control circuitry is configured to select all available requests from the first snapshot before selecting any requests from the second snapshot that are not in the first snapshot. As one example, the arbitration circuitry may select one or more requests from the second snapshot, that are not in the first snapshot, while one or more requests from the first snapshot are still queued, e.g., if the one or more requests from the first snapshot are not available. Requests from the first snapshot may not be available for various reasons. As one example, requests from the first snapshot may be unavailable due to lack of credits.

In some embodiments, the control circuitry is configured to provide a greater priority weight to requests from the first snapshot than requests from the second snapshot that are not in the first snapshot. This may result in requests from the first snapshot being selected preferentially over request from the second snapshot.

In some embodiments, the control circuitry is configured to select all requests from the first snapshot before selecting any requests from the second snapshot that are not in the first snapshot.

In some embodiments, the control circuitry is configured to use weighted round-robin arbitration among the queues prior to detecting the first threshold condition and round-robin arbitration among queues for requests in the first snapshot subsequent to detecting the first threshold condition.

In some embodiments, the control circuitry includes at least three sets of counters configured to maintain information that indicates current numbers of requests in three or more snapshots for respective ones of the queues. In some embodiments, the control circuitry is configured to update the counters based on queued requests winning arbitration.

In some embodiments, the control circuitry is included in a split cache architecture in which a cache includes a first portion associated with a first processor sub-unit and a second portion associated with a second processor sub-unit. In some embodiments, the device includes router circuitry configured to route cache access requests from the second processor sub-unit to the first portion of the cache. The queue circuitry and control circuitry may be included in the router circuitry. In some embodiments, the cache includes at least three portions associated with respective processor sub-units and the router circuitry is configured to route cache access requests in at least three directions.

In some embodiments, the queue circuitry and control circuitry are included in circuitry that routes memory access requests for one or more shader cores of a graphics processor.

Example Device

Figure 11:
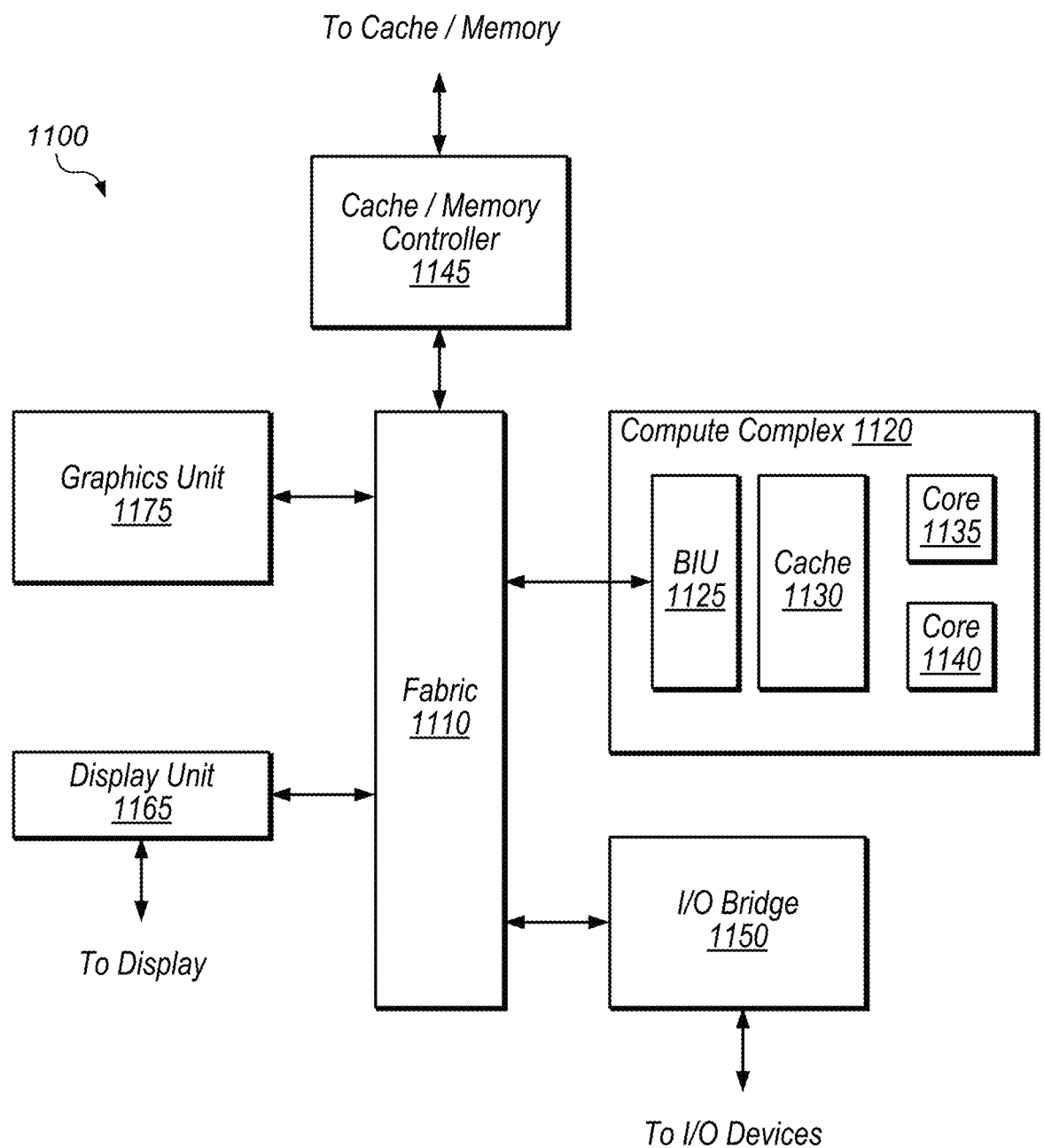
FIG. 11 is a block diagram illustrating an example computing device, according to some embodiments.

Referring now to FIG. 11, a block diagram illustrating an example embodiment of a device 1100 is shown. In some embodiments, elements of device 1100 may be included within a system on a chip. In some embodiments, device 1100 may be included in a mobile device, which may be battery-powered. Therefore, power consumption by device 1100 may be an important design consideration. In the illustrated embodiment, device 1100 includes fabric 1110, compute complex 1120 input/output (I/O) bridge 1150, cache/memory controller 1145, graphics unit 1175, and display unit 1165. In some embodiments, device 1100 may include other components (not shown) in addition to or in place of the illustrated components, such as video processor encoders and decoders, image processing or recognition elements, computer vision elements, etc.

Fabric 1110 may include various interconnects, buses, MUX's, controllers, etc., and may be configured to facilitate communication between various elements of device 1100. In some embodiments, portions of fabric 1110 may be configured to implement various different communication protocols. In other embodiments, fabric 1110 may implement a single communication protocol and elements coupled to fabric 1110 may convert from the single communication protocol to other communication protocols internally.

The disclosed arbitration circuitry that supports snapshotting may be utilized at one or more of various locations within device 1100, including, without limitation, graphics unit 1175, fabric 1110, compute complex 1120, cache/memory controller 1145, etc.

In the illustrated embodiment, compute complex 1120 includes bus interface unit (BIU) 1125, cache 1130, and cores 1135 and 1140. In various embodiments, compute complex 1120 may include various numbers of processors, processor cores and caches. For example, compute complex 1120 may include 1, 2, or 4 processor cores, or any other suitable number. In one embodiment, cache 1130 is a set associative L2 cache. In some embodiments, cores 1135 and 1140 may include internal instruction and data caches. In some embodiments, a coherency unit (not shown) in fabric 1110, cache 1130, or elsewhere in device 1100 may be configured to maintain coherency between various caches of device 1100. BIU 1125 may be configured to manage communication between compute complex 1120 and other elements of device 1100. Processor cores such as cores 1135 and 1140 may be configured to execute instructions of a particular instruction set architecture (ISA) which may include operating system instructions and user application instructions.

Cache/memory controller 1145 may be configured to manage transfer of data between fabric 1110 and one or more caches and memories. For example, cache/memory controller 1145 may be coupled to an L3 cache, which may in turn be coupled to a system memory. In other embodiments, cache/memory controller 1145 may be directly coupled to a memory. In some embodiments, cache/memory controller 1145 may include one or more internal caches.

As used herein, the term "coupled to" may indicate one or more connections between elements, and a coupling may include intervening elements. For example, in FIG. 11, graphics unit 1175 may be described as "coupled to" a memory through fabric 1110 and cache/memory controller 1145. In contrast, in the illustrated embodiment of FIG. 11, graphics unit 1175 is "directly coupled" to fabric 1110 because there are no intervening elements.

Graphics unit 1175 may include one or more processors, e.g., one or more graphics processing units (GPU's). Graphics unit 1175 may receive graphics-oriented instructions, such as OPENGL®, Metal, or DIRECT3D® instructions, for example. Graphics unit 1175 may execute specialized GPU instructions or perform other operations based on the received graphics-oriented instructions. Graphics unit 1175 may generally be configured to process large blocks of data in parallel and may build images in a frame buffer for output to a display, which may be included in the device or may be a separate device. Graphics unit 1175 may include transform, lighting, triangle, and rendering engines in one or more graphics processing pipelines. Graphics unit 1175 may output pixel information for display images. Graphics unit 1175, in various embodiments, may include programmable shader circuitry which may include highly parallel execution cores configured to execute graphics programs, which may include pixel tasks, vertex tasks, and compute tasks (which may or may not be graphics-related).

Display unit 1165 may be configured to read data from a frame buffer and provide a stream of pixel values for display. Display unit 1165 may be configured as a display pipeline in some embodiments. Additionally, display unit 1165 may be configured to blend multiple frames to produce an output frame. Further, display unit 1165 may include one or more interfaces (e.g., MIPI® or embedded display port (eDP)) for coupling to a user display (e.g., a touchscreen or an external display).

I/O bridge 1150 may include various elements configured to implement: universal serial bus (USB) communications, security, audio, and low-power always-on functionality, for example. I/O bridge 1150 may also include interfaces such as pulse-width modulation (PWM), general-purpose input/output (GPIO), serial peripheral interface (SPI), and inter-integrated circuit (I2C), for example. Various types of peripherals and devices may be coupled to device 1100 via I/O bridge 1150.

In some embodiments, device 1100 includes network interface circuitry (not explicitly shown), which may be connected to fabric 1110 or I/O bridge 1150. The network interface circuitry may be configured to communicate via various networks, which may be wired, wireless, or both. For example, the network interface circuitry may be configured to communicate via a wired local area network, a wireless local area network (e.g., via WiFi), or a wide area network (e.g., the Internet or a virtual private network). In some embodiments, the network interface circuitry is configured to communicate via one or more cellular networks that use one or more radio access technologies. In some embodiments, the network interface circuitry is configured to communicate using device-to-device communications (e.g., Bluetooth or WiFi Direct), etc. In various embodiments, the network interface circuitry may provide device 1100 with connectivity to various types of other devices and networks.

Example Applications

Figure 12:
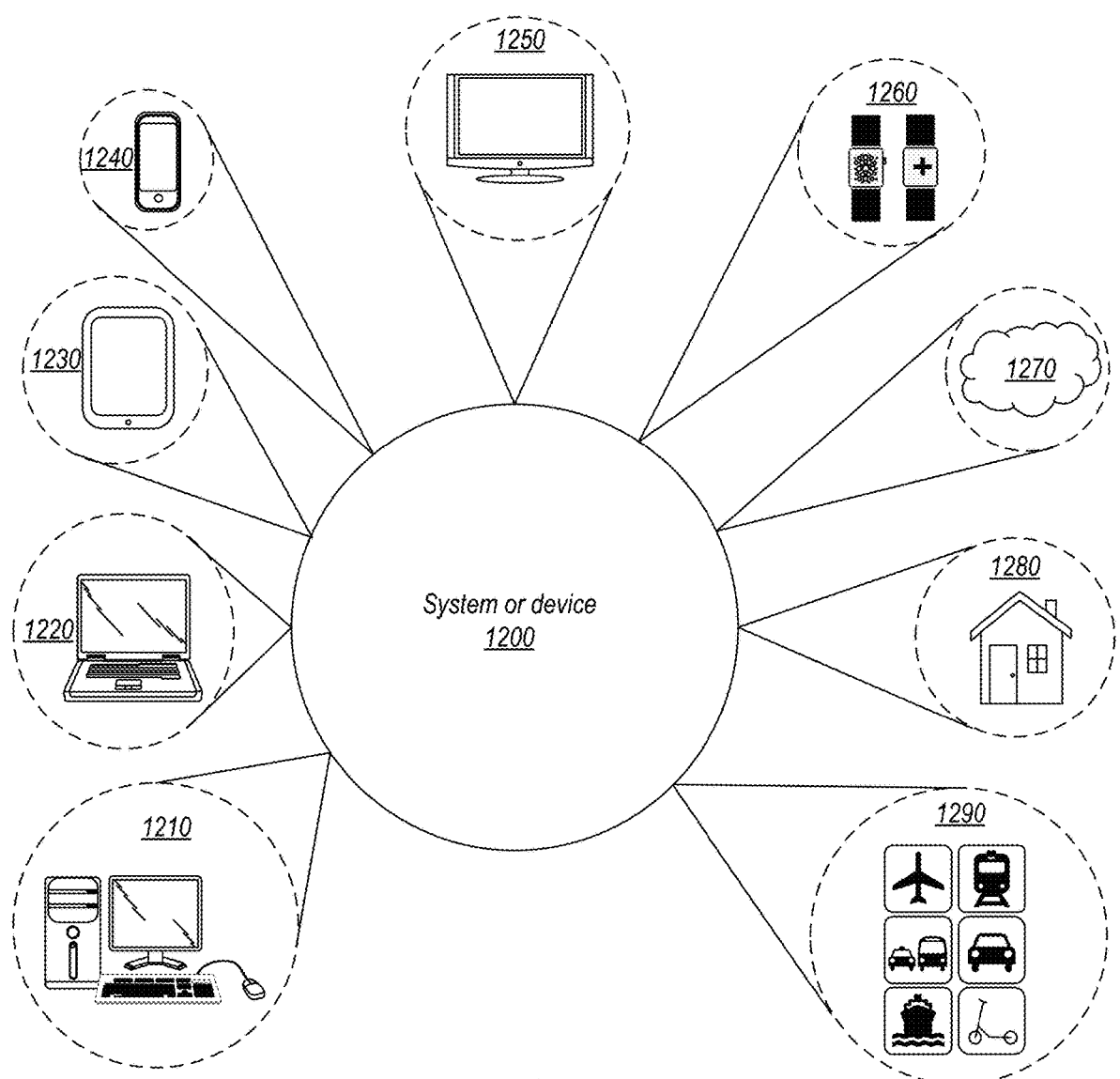
FIG. 12 is a diagram illustrating example applications of disclosed systems and devices, according to some embodiments.

Turning now to FIG. 12, various types of systems that may include any of the circuits, devices, or system discussed above. System or device 1200, which may incorporate or otherwise utilize one or more of the techniques described herein, may be utilized in a wide range of areas. For example, system or device 1200 may be utilized as part of the hardware of systems such as a desktop computer 1210, laptop computer 1220, tablet computer 1230, cellular or mobile phone 1240, or television 1250 (or set-top box coupled to a television).

Similarly, disclosed elements may be utilized in a wearable device 1260, such as a smartwatch or a health-monitoring device. Smartwatches, in many embodiments, may implement a variety of different functions—for example, access to email, cellular service, calendar, health monitoring, etc. A wearable device may also be designed solely to perform health-monitoring functions, such as monitoring a user's vital signs, performing epidemiological functions such as contact tracing, providing communication to an emergency medical service, etc. Other types of devices are also contemplated, including devices worn on the neck, devices implantable in the human body, glasses or a helmet designed to provide computer-generated reality experiences such as those based on augmented and/or virtual reality, etc.

System or device 1200 may also be used in various other contexts. For example, system or device 1200 may be utilized in the context of a server computer system, such as a dedicated server or on shared hardware that implements a cloud-based service 1270. Still further, system or device 1200 may be implemented in a wide range of specialized everyday devices, including devices 1280 commonly found in the home such as refrigerators, thermostats, security cameras, etc. The interconnection of such devices is often referred to as the "Internet of Things" (IoT). Elements may also be implemented in various modes of transportation. For example, system or device 1200 could be employed in the control systems, guidance systems, entertainment systems, etc. of various types of vehicles 1290.

The applications illustrated in FIG. 12 are merely exemplary and are not intended to limit the potential future applications of disclosed systems or devices. Other example applications include, without limitation: portable gaming devices, music players, data storage devices, unmanned aerial vehicles, etc.

Example Computer-Readable Medium

The present disclosure has described various example circuits in detail above. It is intended that the present disclosure cover not only embodiments that include such circuitry, but also a computer-readable storage medium that includes design information that specifies such circuitry. Accordingly, the present disclosure is intended to support claims that cover not only an apparatus that includes the disclosed circuitry, but also a storage medium that specifies the circuitry in a format that is recognized by a fabrication system configured to produce hardware (e.g., an integrated circuit) that includes the disclosed circuitry. Claims to such a storage medium are intended to cover, for example, an entity that produces a circuit design, but does not itself fabricate the design.

Figure 13:
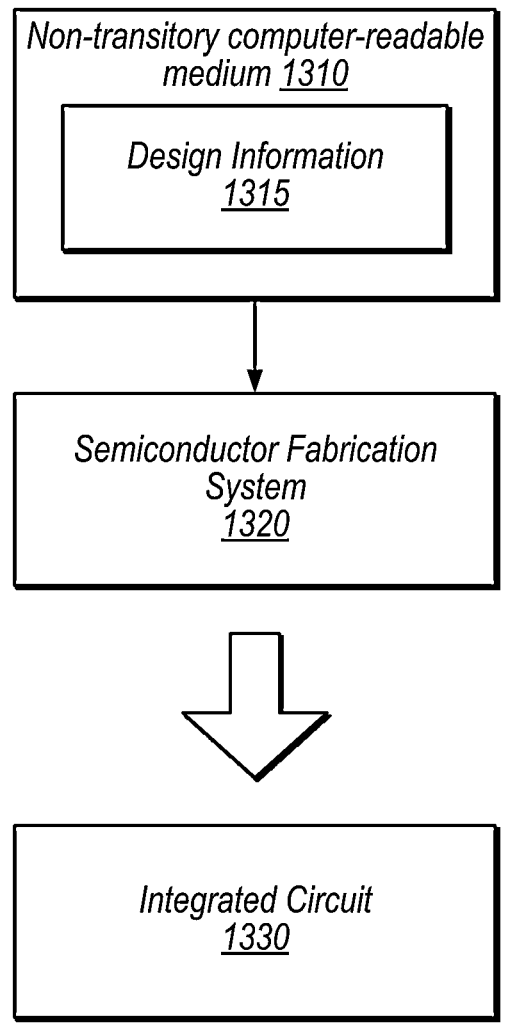
FIG. 13 is a block diagram illustrating an example computer-readable medium that stores circuit design information, according to some embodiments.

FIG. 13 is a block diagram illustrating an example non-transitory computer-readable storage medium that stores circuit design information, according to some embodiments. In the illustrated embodiment semiconductor fabrication system 1320 is configured to process the design information 1315 stored on non-transitory computer-readable medium 1310 and fabricate integrated circuit 1330 based on the design information 1315.

Non-transitory computer-readable storage medium 1310, may comprise any of various appropriate types of memory devices or storage devices. Non-transitory computer-readable storage medium 1310 may be an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. Non-transitory computer-readable storage medium 1310 may include other types of non-transitory memory as well or combinations thereof.

Non-transitory computer-readable storage medium 1310 may include two or more memory mediums which may reside in different locations, e.g., in different computer systems that are connected over a network.

Design information 1315 may be specified using any of various appropriate computer languages, including hardware description languages such as, without limitation: VHDL, Verilog, SystemC, SystemVerilog, RHDL, M, MyHDL, etc. Design information 1315 may be usable by semiconductor fabrication system 1320 to fabricate at least a portion of integrated circuit 1330. The format of design information 1315 may be recognized by at least one semiconductor fabrication system 1320. In some embodiments, design information 1315 may also include one or more cell libraries which specify the synthesis, layout, or both of integrated circuit 1330. In some embodiments, the design information is specified in whole or in part in the form of a netlist that specifies cell library elements and their connectivity. Design information 1315, taken alone, may or may not include sufficient information for fabrication of a corresponding integrated circuit. For example, design information 1315 may specify the circuit elements to be fabricated but not their physical layout. In this case, design information 1315 may need to be combined with layout information to actually fabricate the specified circuitry.

Integrated circuit 1330 may, in various embodiments, include one or more custom macrocells, such as memories, analog or mixed-signal circuits, and the like. In such cases, design information 1315 may include information related to included macrocells. Such information may include, without limitation, schematics capture database, mask design data, behavioral models, and device or transistor level netlists. As used herein, mask design data may be formatted according to graphic data system (GDSII), or any other suitable format.

Semiconductor fabrication system 1320 may include any of various appropriate elements configured to fabricate integrated circuits. This may include, for example, elements for depositing semiconductor materials (e.g., on a wafer, which may include masking), removing materials, altering the shape of deposited materials, modifying materials (e.g., by doping materials or modifying dielectric constants using ultraviolet processing), etc. Semiconductor fabrication system 1320 may also be configured to perform various testing of fabricated circuits for correct operation.

In various embodiments, integrated circuit 1330 is configured to operate according to a circuit design specified by design information 1315, which may include performing any of the functionality described herein. For example, integrated circuit 1330 may include any of various elements shown in FIGS. 1B, 2, 5-9, and 11. Further, integrated circuit 1330 may be configured to perform various functions described herein in conjunction with other components. Further, the functionality described herein may be performed by multiple connected integrated circuits.

As used herein, a phrase of the form "design information that specifies a design of a circuit configured to . . . " does not imply that the circuit in question must be fabricated in order for the element to be met. Rather, this phrase indicates that the design information describes a circuit that, upon being fabricated, will be configured to perform the indicated actions or will include the specified components.

The present disclosure includes references to "an "embodiment" or groups of "embodiments" (e.g., "some embodiments" or "various embodiments"). Embodiments are different implementations or instances of the disclosed concepts. References to "an embodiment," "one embodiment," "a particular embodiment," and the like do not necessarily refer to the same embodiment. A large number of possible embodiments are contemplated, including those specifically disclosed, as well as modifications or alternatives that fall within the spirit or scope of the disclosure.

This disclosure may discuss potential advantages that may arise from the disclosed embodiments. Not all implementations of these embodiments will necessarily manifest any or all of the potential advantages. Whether an advantage is realized for a particular implementation depends on many factors, some of which are outside the scope of this disclosure. In fact, there are a number of reasons why an implementation that falls within the scope of the claims might not exhibit some or all of any disclosed advantages. For example, a particular implementation might include other circuitry outside the scope of the disclosure that, in conjunction with one of the disclosed embodiments, negates or diminishes one or more the disclosed advantages. Furthermore, suboptimal design execution of a particular implementation (e.g., implementation techniques or tools) could also negate or diminish disclosed advantages. Even assuming a skilled implementation, realization of advantages may still depend upon other factors such as the environmental circumstances in which the implementation is deployed. For example, inputs supplied to a particular implementation may prevent one or more problems addressed in this disclosure from arising on a particular occasion, with the result that the benefit of its solution may not be realized. Given the existence of possible factors external to this disclosure, it is expressly intended that any potential advantages described herein are not to be construed as claim limitations that must be met to demonstrate infringement. Rather, identification of such potential advantages is intended to illustrate the type(s) of improvement available to designers having the benefit of this disclosure. That such advantages are described permissively (e.g., stating that a particular advantage "may arise") is not intended to convey doubt about whether such advantages can in fact be realized, but rather to recognize the technical reality that realization of such advantages often depends on additional factors.

Unless stated otherwise, embodiments are non-limiting. That is, the disclosed embodiments are not intended to limit the scope of claims that are drafted based on this disclosure, even where only a single example is described with respect to a particular feature. The disclosed embodiments are intended to be illustrative rather than restrictive, absent any statements in the disclosure to the contrary. The application is thus intended to permit claims covering disclosed embodiments, as well as such alternatives, modifications, and equivalents that would be apparent to a person skilled in the art having the benefit of this disclosure.

For example, features in this application may be combined in any suitable manner. Accordingly, new claims may be formulated during prosecution of this application (or an application claiming priority thereto) to any such combination of features. In particular, with reference to the appended claims, features from dependent claims may be combined with those of other dependent claims where appropriate, including claims that depend from other independent claims. Similarly, features from respective independent claims may be combined where appropriate.

Accordingly, while the appended dependent claims may be drafted such that each depends on a single other claim, additional dependencies are also contemplated. Any combinations of features in the dependent that are consistent with this disclosure are contemplated and may be claimed in this or another application. In short, combinations are not limited to those specifically enumerated in the appended claims.

Where appropriate, it is also contemplated that claims drafted in one format or statutory type (e.g., apparatus) are intended to support corresponding claims of another format or statutory type (e.g., method).

Because this disclosure is a legal document, various terms and phrases may be subject to administrative and judicial interpretation. Public notice is hereby given that the following paragraphs, as well as definitions provided throughout the disclosure, are to be used in determining how to interpret claims that are drafted based on this disclosure.

References to a singular form of an item (i.e., a noun or noun phrase preceded by "a," "an," or "the") are, unless context clearly dictates otherwise, intended to mean "one or more." Reference to "an item" in a claim thus does not, without accompanying context, preclude additional instances of the item. A "plurality" of items refers to a set of two or more of the items.

The word "may" is used herein in a permissive sense (i.e., having the potential to, being able to) and not in a mandatory sense (i.e., must).

The terms "comprising" and "including," and forms thereof, are open-ended and mean "including, but not limited to."

When the term "or" is used in this disclosure with respect to a list of options, it will generally be understood to be used in the inclusive sense unless the context provides otherwise. Thus, a recitation of "x or y" is equivalent to "x or y, or both," and thus covers 1) x but not y, 2) y but not x, and 3) both x and y. On the other hand, a phrase such as "either x or y, but not both" makes clear that "or" is being used in the exclusive sense.

A recitation of "w, x, y, or z, or any combination thereof" or "at least one of . . . w, x, y, and z" is intended to cover all possibilities involving a single element up to the total number of elements in the set. For example, given the set [w, x, y, z], these phrasings cover any single element of the set (e.g., w but not x, y, or z), any two elements (e.g., w and x, but not y or z), any three elements (e.g., w, x, and y, but not z), and all four elements. The phrase "at least one of . . . w, x, y, and z" thus refers to at least one element of the set [w, x, y, z], thereby covering all possible combinations in this list of elements. This phrase is not to be interpreted to require that there is at least one instance of w, at least one instance of x, at least one instance of y, and at least one instance of z.

Various "labels" may precede nouns or noun phrases in this disclosure. Unless context provides otherwise, different labels used for a feature (e.g., "first circuit," "second circuit," "particular circuit," "given circuit," etc.) refer to different instances of the feature. Additionally, the labels "first," "second," and "third" when applied to a feature do not imply any type of ordering (e.g., spatial, temporal, logical, etc.), unless stated otherwise.

The phrase "based on" or is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

The phrases "in response to" and "responsive to" describe one or more factors that trigger an effect. This phrase does not foreclose the possibility that additional factors may affect or otherwise trigger the effect, either jointly with the specified factors or independent from the specified factors. That is, an effect may be solely in response to those factors, or may be in response to the specified factors as well as other, unspecified factors. Consider the phrase "perform A in response to B." This phrase specifies that B is a factor that triggers the performance of A, or that triggers a particular result for A. This phrase does not foreclose that performing A may also be in response to some other factor, such as C. This phrase also does not foreclose that performing A may be jointly in response to B and C. This phrase is also intended to cover an embodiment in which A is performed solely in response to B. As used herein, the phrase "responsive to" is synonymous with the phrase "responsive at least in part to." Similarly, the phrase "in response to" is synonymous with the phrase "at least in part in response to."

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical). More specifically, this formulation is used to indicate that this structure is arranged to perform the one or more tasks during operation. A structure can be said to be "configured to" perform some task even if the structure is not currently being operated. Thus, an entity described or recited as being "configured to" perform some task refers to something physical, such as a device, circuit, a system having a processor unit and a memory storing program instructions executable to implement the task, etc. This phrase is not used herein to refer to something intangible.

In some cases, various units/circuits/components may be described herein as performing a set of task or operations. It is understood that those entities are "configured to" perform those tasks/operations even if not specifically noted.

The term "configured to" is not intended to mean "configurable to." An unprogrammed FPGA, for example, would not be considered to be "configured to" perform a particular function. This unprogrammed FPGA may be "configurable to" perform that function, however. After appropriate programming, the FPGA may then be said to be "configured to" perform the particular function.

For purposes of United States patent applications based on this disclosure, reciting in a claim that a structure is "configured to" perform one or more tasks is expressly intended not to invoke 35 U.S.C. § 112(f) for that claim element. Should Applicant wish to invoke Section 112(f) during prosecution of a United States patent application based on this disclosure, it will recite claim elements using the "means for" [performing a function] construct.

Different "circuits" may be described in this disclosure. These circuits or "circuitry" constitute hardware that includes various types of circuit elements, such as combinatorial logic, clocked storage devices (e.g., flip-flops, registers, latches, etc.), finite state machines, memory (e.g., random-access memory, embedded dynamic random-access memory), programmable logic arrays, and so on. Circuitry may be custom designed, or taken from standard libraries. In various implementations, circuitry can, as appropriate, include digital components, analog components, or a combination of both. Certain types of circuits may be commonly referred to as "units" (e.g., a decode unit, an arithmetic logic unit (ALU), functional unit, memory management unit (MMU), etc.). Such units also refer to circuits or circuitry.

The disclosed circuits/units/components and other elements illustrated in the drawings and described herein thus include hardware elements such as those described in the preceding paragraph. In many instances, the internal arrangement of hardware elements within a particular circuit may be specified by describing the function of that circuit. For example, a particular "decode unit" may be described as performing the function of "processing an opcode of an instruction and routing that instruction to one or more of a plurality of functional units," which means that the decode unit is "configured to" perform this function. This specification of function is sufficient, to those skilled in the computer arts, to connote a set of possible structures for the circuit.

In various embodiments, as discussed in the preceding paragraph, circuits, units, and other elements may be defined by the functions or operations that they are configured to implement. The arrangement and such circuits/units/components with respect to each other and the manner in which they interact form a microarchitectural definition of the hardware that is ultimately manufactured in an integrated circuit or programmed into an FPGA to form a physical implementation of the microarchitectural definition. Thus, the microarchitectural definition is recognized by those of skill in the art as structure from which many physical implementations may be derived, all of which fall into the broader structure described by the microarchitectural definition. That is, a skilled artisan presented with the microarchitectural definition supplied in accordance with this disclosure may, without undue experimentation and with the application of ordinary skill, implement the structure by coding the description of the circuits/units/components in a hardware description language (HDL) such as Verilog or VHDL. The HDL description is often expressed in a fashion that may appear to be functional. But to those of skill in the art in this field, this HDL description is the manner that is used transform the structure of a circuit, unit, or component to the next level of implementational detail. Such an HDL description may take the form of behavioral code (which is typically not synthesizable), register transfer language (RTL) code (which, in contrast to behavioral code, is typically synthesizable), or structural code (e.g., a netlist specifying logic gates and their connectivity). The HDL description may subsequently be synthesized against a library of cells designed for a given integrated circuit fabrication technology, and may be modified for timing, power, and other reasons to result in a final design database that is transmitted to a foundry to generate masks and ultimately produce the integrated circuit. Some hardware circuits or portions thereof may also be custom-designed in a schematic editor and captured into the integrated circuit design along with synthesized circuitry. The integrated circuits may include transistors and other circuit elements (e.g. passive elements such as capacitors, resistors, inductors, etc.) and interconnect between the transistors and circuit elements. Some embodiments may implement multiple integrated circuits coupled together to implement the hardware circuits, and/or discrete elements may be used in some embodiments. Alternatively, the HDL design may be synthesized to a programmable logic array such as a field programmable gate array (FPGA) and may be implemented in the FPGA. This decoupling between the design of a group of circuits and the subsequent low-level implementation of these circuits commonly results in the scenario in which the circuit or logic designer never specifies a particular set of structures for the low-level implementation beyond a description of what the circuit is configured to do, as this process is performed at a different stage of the circuit implementation process.

The fact that many different low-level combinations of circuit elements may be used to implement the same specification of a circuit results in a large number of equivalent structures for that circuit. As noted, these low-level circuit implementations may vary according to changes in the fabrication technology, the foundry selected to manufacture the integrated circuit, the library of cells provided for a particular project, etc. In many cases, the choices made by different design tools or methodologies to produce these different implementations may be arbitrary.

Moreover, it is common for a single implementation of a particular functional specification of a circuit to include, for a given embodiment, a large number of devices (e.g., millions of transistors). Accordingly, the sheer volume of this information makes it impractical to provide a full recitation of the low-level structure used to implement a single embodiment, let alone the vast array of equivalent possible implementations. For this reason, the present disclosure describes structure of circuits using the functional shorthand commonly employed in the industry.

What is claimed is:

1. An apparatus, comprising:
   queue circuitry that implements multiple queues configured to queue requests to access a shared circuit resource;
   control circuitry configured to:
      generate a first snapshot that indicates numbers of requests in respective queues of the multiple queues at a first time;
      generate a second snapshot that indicates numbers of requests in respective queues of the multiple queues at a second time that is subsequent to the first time; and
      arbitrate between requests from the multiple queues to select requests to access the shared circuit resource, wherein the arbitration is based on snapshots to which requests from the multiple queues belong and prioritizes requests from the first snapshot, but is configured to select a request from the second snapshot before a request from the first snapshot if requests from the first snapshot have a stall condition.

2. The apparatus of claim 1, wherein the control circuitry is configured to generate the first snapshot based on a first threshold condition associated with the queue circuitry.

3. The apparatus of claim 2, wherein the first threshold condition corresponds to one or more of the following threshold conditions:
   a threshold number of valid entries in a queue;
   a threshold number of queues meeting a threshold number of valid entries; and
   entries in a set of multiple queues meeting a threshold number of valid entries.

4. The apparatus of claim 2, wherein the control circuitry is configured to arbitrate using a first arbitration technique among the queues prior to detection of the first threshold condition and arbitrate using a second arbitration technique among queues for requests in the first snapshot subsequent to detecting the first threshold condition.

5. The apparatus of claim 1, wherein the control circuitry is configured to determine a stall condition for one or more requests from the first snapshot based on lack of credits according to a credit system.

6. The apparatus of claim 1, wherein the control circuitry is configured to provide a greater priority weight to requests from the first snapshot than requests from the second snapshot that are not in the first snapshot.

7. The apparatus of claim 1, wherein the control circuitry is configured to select all non-stalled requests from the first snapshot before selecting any requests from the second snapshot that are not in the first snapshot.

8. The apparatus of claim 1, wherein the control circuitry includes at least three sets of counters configured to maintain information that indicates current numbers of requests in three or more snapshots for respective ones of the queues, wherein the control circuitry is configured to update the counters based on queued requests winning arbitration.

9. The apparatus of claim 1, wherein one or more of the queues maintain ordering among requests of one or more virtual channels that are shared by multiple client circuits.

10. The apparatus of claim 1, wherein the queue circuitry and control circuitry are included in router circuitry configured to route requests between different cache circuits.

11. The apparatus of claim 10, wherein the different cache circuits implement different portions of a cache that is shared among multiple processor sub-units.

12. The apparatus of claim 1, wherein the queue circuitry and control circuitry are included in circuitry that routes memory access requests for one or more shader cores of a graphics processor.

13. The apparatus of claim 1, wherein the shared circuit resource is a memory bus.

14. The apparatus of claim 1, wherein the apparatus is a computing device that further comprises:
   a display; and
   a network interface.

15. A method, comprising:
   storing, by a computing system in multiple queues, requests to access a shared circuit resource;
   generating, by the computing system, a first snapshot that indicates numbers of requests in respective queues of the multiple queues at a first time;
   generating, by the computing system, a second snapshot that indicates numbers of requests in respective queues of the multiple queues at a second time that is subsequent to the first time; and
   arbitrating, by the computing system, between requests from the multiple queues to select requests to access the shared circuit resource, wherein the arbitrating is based on snapshots to which requests from the multiple queues belong and prioritizes requests from the first snapshot, but is configured to select a request from the second snapshot before a request from the first snapshot if requests from the first snapshot have a stall condition.

16. The method of claim 15, wherein the generating the first snapshot is based on detecting a first threshold condition associated with the multiple queues, wherein the first threshold condition corresponds to one or more of the following threshold conditions:
   a threshold number of valid entries in a queue;
   a threshold number of queues meeting a threshold number of valid entries; and entries in a set of multiple queues meeting a threshold number of valid entries.

17. The method of claim 15, further comprising detecting a stall condition for one or more requests from the first snapshot based on lack of credits according to a credit system.

18. The method of claim 15, wherein one or more of the queues maintain ordering among requests of one or more virtual channels that are shared by multiple client circuits.

19. A non-transitory computer readable storage medium having stored thereon design information that specifies a design of at least a portion of a hardware integrated circuit in a format recognized by a semiconductor fabrication system that is configured to use the design information to produce the circuit according to the design, wherein the design information specifies that the circuit includes:
   queue circuitry that implements multiple queues configured to queue requests to access a shared circuit resource;
   control circuitry configured to:
      generate a first snapshot that indicates numbers of requests in respective queues of the multiple queues at a first time;
      generate a second snapshot that indicates numbers of requests in respective queues of the multiple queues at a second time that is subsequent to the first time; and
      arbitrate between requests from the multiple queues to select requests to access the shared circuit resource, wherein the arbitration is based on snapshots to which requests from the multiple queues belong and prioritizes requests from the first snapshot, but is configured to select a request from the second snapshot before a request from the first snapshot if requests from the first snapshot have a stall condition.

20. The non-transitory computer readable storage medium of claim 19, wherein the control circuitry is configured to generate the first snapshot based on a first threshold condition associated with the queue circuitry.

* * * * *